Patented Apr. 21, 1936

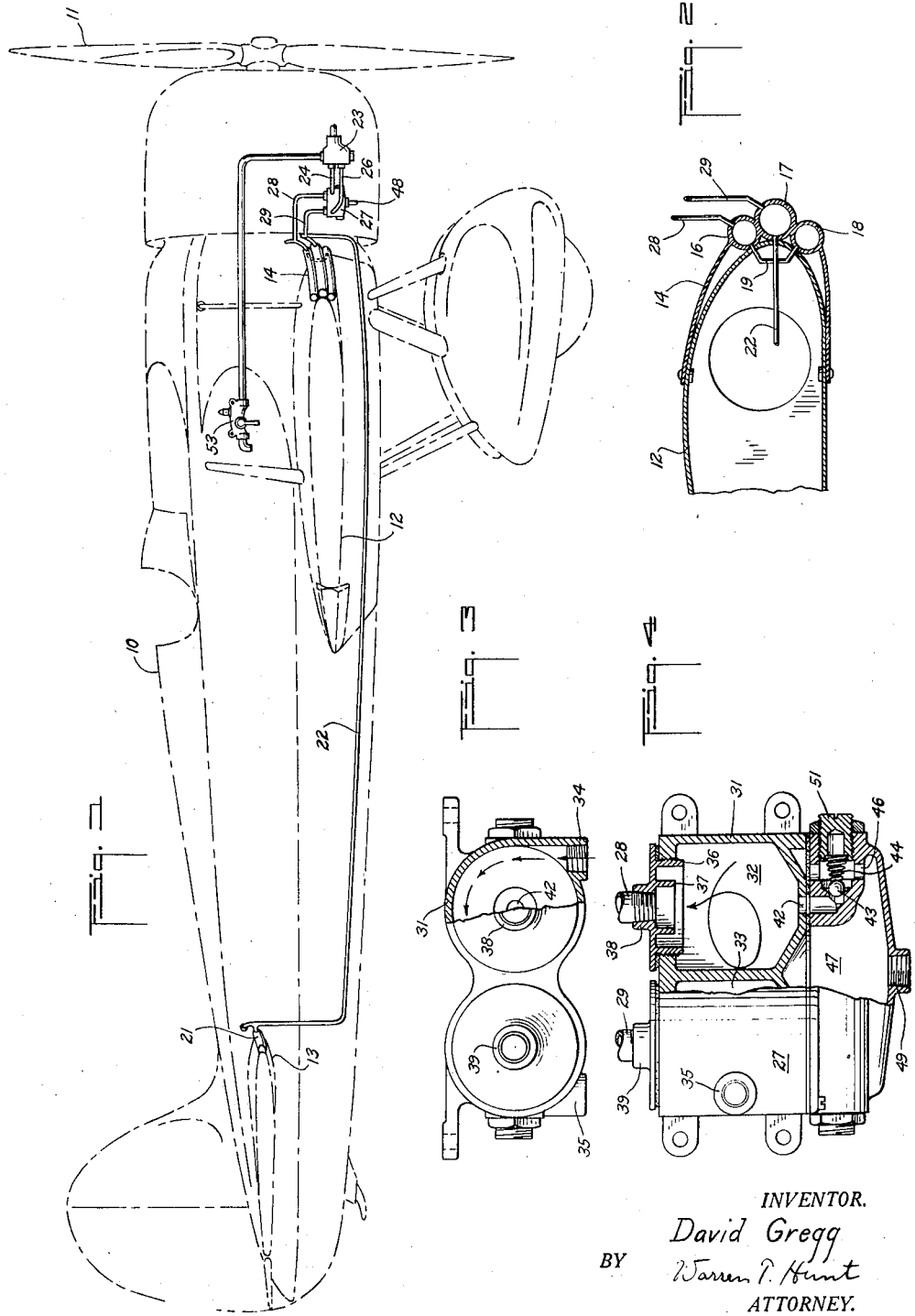

2,038,039

UNITED STATES PATENT OFFICE 2,038,039

OIL SEPARATOR

David Gregg, Caldwell, N. J., assignor to Eclipse Aviation Corporation, East Orange, N. J., a corporation of New Jersey Application September 15, 1933, Serial No. 689,654

2 Claims. (Cl. 183—85)

This invention relates to de-icer systems for airplanes and more particularly to a novel oil separator for preventing oil and other liquids from entering the inflatable de-icer shoes which are ordinarily composed of rubber and therefore will deteriorate if oil is permitted to enter the shoes with the inflating air supply.

An object of the invention is to provide an oil separator in a de-icer system which is located between the pressure pump and the inflatable shoe and is so constructed as to periodically eject the oil at each inflation cycle.

Another object of the invention is to provide an oil separator having a plurality of receiving chambers in which the oil is collected from the line between the pump and the shoes and periodically ejected into a collection chamber common to all of the receiving chambers from which it may be returned to the engine or otherwise disposed of.

A feature of the invention relates to a novel construction of the separator and its arrangement with respect to the air pump and inflatable shoes, the oil separator being so built that the oil is collected in the bottom of the separator and ejected periodically through pressure operated check valves that open during each inflation cycle of the pump.

Other features and objects of the invention will be apparent from the following description in connection with which a preferred embodiment of the invention has been illustrated in the accompanying drawing in which, Fig. 1 is a side elevation of an airplane upon which the improved oil separator is installed in a de-icer system;

Fig. 2 is a sectional view through a portion of the wing structure illustrated in Fig. 1 which shows a convenient arrangement of the de-icer inflatable members whereby the inflatable members may be arranged in two groups and the conduits from the combined pump and distributor may alternately act as supply and return lines;

Fig. 3 is an enlarged top plan view partly in section of the improved oil separator; and Fig. 4 is an enlarged elevational view partly in section of the improved oil separator.

The details of the combined engine driven pump and distributor form no part of the present application and are illustrated herein only for better illustrating the use of the improved oil separators and need not be further described in the present application.

Referring to the drawing, 10 represents an airplane having a propeller 11, wing 12, and an elevator 13. Wing 12 is provided with an inflatable de-icer or ice overshoe 14 preferably composed of three separate members 16, 17, and 18, of which 16 and 18 are connected by pipe 19, and section 17 is connected to an inflatable member 21 provided on the elevator 13 by a pipe 22. The groups of the inflatable members are alternately inflated in recurring cycles by an engine driven pump 23 having conduits 24 and 26 respectively which are connected to inflatable members 16 and 17 through oil separator 27 and pipes 28 and 29. The combined distributor and pump 23 may be of any desired construction, the only requisite being that it inflate and deflate the inflatable rubber members 16, 17, 18, and 21 in recurring cycles. The oil separator which is better shown in Figs. 3 and 4 comprises a housing 31 having two cylindrical chambers 32 and 33 formed therein, each of which forms an oil receiving chamber located between the pump and the inflatable member. The inflation air enters the oil separator at 34 and 35 in the direction of the arrows and as the inlets 34 and 35 are substantially tangent to the internal walls of cylinders 32 and 33, the heavier particles of oil are deposited on the vertical walls of the chamber and collect in the lower part of the cylinders, whereas the air may pass outwardly around baffles 36 and 37 to the outlets 38 and 39 which are connected respectively to pipes 28 and 29 leading to the rubber shoes. It is understood that in the system with which the separator is used inflation and deflation occurs in recurring cycles, therefore the pressure in each chamber is variable and preferably the group of shoes represented by 16 and 18 is being inflated while shoes 17 and 21 are being deflated. The lower part of each oil separator cylinder is provided with an opening 42 which opening is closed by a ball 43 held upon its seat by spring 44 preferably of such a tension as to permit valve 43 to be forced from its seat shortly before the end of the inflation cycle. Opening of the check valve causes any oil collected in the cylinder 32 to be ejected through opening 46 into the oil receiving compartment 47 from which it may be led back to the engine or otherwise disposed of by means of pipe 48 which is connected to outlet 49 from the collecting chamber.

It is desirable in de-icer systems to use a pump in which the air in the inflated ice overshoes is led back to the intake side of the pump and to waste as little air as possible, therefore it is desirable that spring 44 be so regulated by adjusting nut 51 that valve 43 will open at a pressure which is only slightly below the maximum pressure that the pump delivers before a reversal of the inflation cycle. Shortly after valve 43 has been opened by the pneumatic pressure within the system, the cycle of operation reverses and pipe 24 which formerly was the outlet for the pump 23 becomes the return pipe from the inflatable members, and pipe 26 now becomes the pump outlet at which time the inflation cycle in shoes 17 and 13 begins and cylinder 34 acts as the oil separator for these members in the same manner as has just been described in the operation of shoes 16 and 18. If desired, a control valve 53 may be incorporated for rendering the system inoperative, but the details of the operating pump and control valve form no part of the present invention.

While a preferred embodiment of the invention has been illustrated and described, it is to be understood that this showing and description are illustrative only and that the invention is not limited to the form shown and described, or otherwise, except by the terms of the following claims:

What is claimed is:

1. In an oil separator for a device operable by variations in gaseous pressure, a housing, a wall dividing said housing into a pair of compartments, each compartment having inlet and outlet means for causing gases to circulate freely through each compartment, baffling means in each compartment for causing oil to be collected therein, an outwardly opening valve in each compartment arranged to open at pressures above a predetermined value for discharging accumulated oil from the compartment, means secured to the housing below the compartments enclosing the discharge openings from both valves and forming a common oil receiving chamber, and a drainage oil conduit in the bottom of the oil receiving chamber.

2. In an oil separator for a device operable by variations in gaseous pressure, a housing, a wall dividing said housing into a pair of compartments, each compartment having inlet and outlet means for causing gases to circulate freely through each compartment, baffling means in each compartment for causing oil to be collected therein, each compartment having a discharge opening in the bottom thereof, an oil receiving chamber secured to the housing below the compartments enclosing the discharge openings, said chamber having a spring loaded valve for each discharge opening, a movable abutment for each valve spring extending through the chamber wall and arranged to be moved from the exterior thereof to adjust the valve spring, and a drainage oil conduit in the bottom of the oil receiving chamber.

DAVID GREGG.